United States Patent
Kanamori (10) Patent No.: US 7,233,360 B2
(45) Date of Patent: Jun. 19, 2007

(54) STAND FOR DIGITAL CAMERA

(75) Inventor: Shino Kanamori, Saitama-ken (JP)

(73) Assignee: Fujifilm Corporation, Tokyo (JP)

(*) Notice: Subject to any disclaimer, the term of this patent is extended or adjusted under 35 U.S.C. 154(b) by 606 days.

(21) Appl. No.: 10/270,352

(22) Filed: Oct. 15, 2002

(65) Prior Publication Data
US 2003/0071915 A1    Apr. 17, 2003

(30) Foreign Application Priority Data
Oct. 15, 2001    (JP) .............................. 2001-316257

(51) Int. Cl.
*H04N 5/225* (2006.01)
(52) U.S. Cl. ..................................... 348/375
(58) Field of Classification Search ................... None
See application file for complete search history.

(56) References Cited

U.S. PATENT DOCUMENTS

| 5,602,458 | A | * | 2/1997 | Dowe | .......................... 396/205 |
| 6,441,854 | B2 | * | 8/2002 | Fellegara et al. | ...... 348/333.13 |
| 2001/0005222 | A1 | * | 6/2001 | Yamaguchi | .................. 348/223 |

* cited by examiner

*Primary Examiner*—Ngoc-Yen Vu
*Assistant Examiner*—Hung H. Lam
(74) *Attorney, Agent, or Firm*—Sughrue Mion, PLLC (57) ABSTRACT

In order that a recording medium can be attached to or detached from a main body of a digital camera in a state in which the digital camera is mounted on a stand for digital camera, there is provided the stand in which, a portion of a wall portion of the stand, facing a lower portion of a slot cover formed at a side surface of the camera man body of the digital camera in a state in which the digital camera is mounted on a holding portion of the stand, is an opening and closing wall portion, and the cover of the main body can be opened by opening the opening and closing wall portion.

10 Claims, 9 Drawing Sheets

PRIOR ART

STAND FOR DIGITAL CAMERA

BACKGROUND OF THE INVENTION

1. Field of the Invention

The present invention relates to a stand for digital camera, and particularly to a stand for digital camera on which a digital camera, in which recording medium capable of attaching to or detaching from a main body of the digital camera is used, is mounted.

2. Description of the Related Art

Conventionally, in an ordinal digital camera, a recording medium on which a photographed image or the like is recorded can be attached to or detached from (inserted into or picked up from) a main body of the digital camera. The image is easily read out by inserting the recording medium, picked up from the main body of the digital camera, into an image reading device such as a personal computer.

Figure 9:
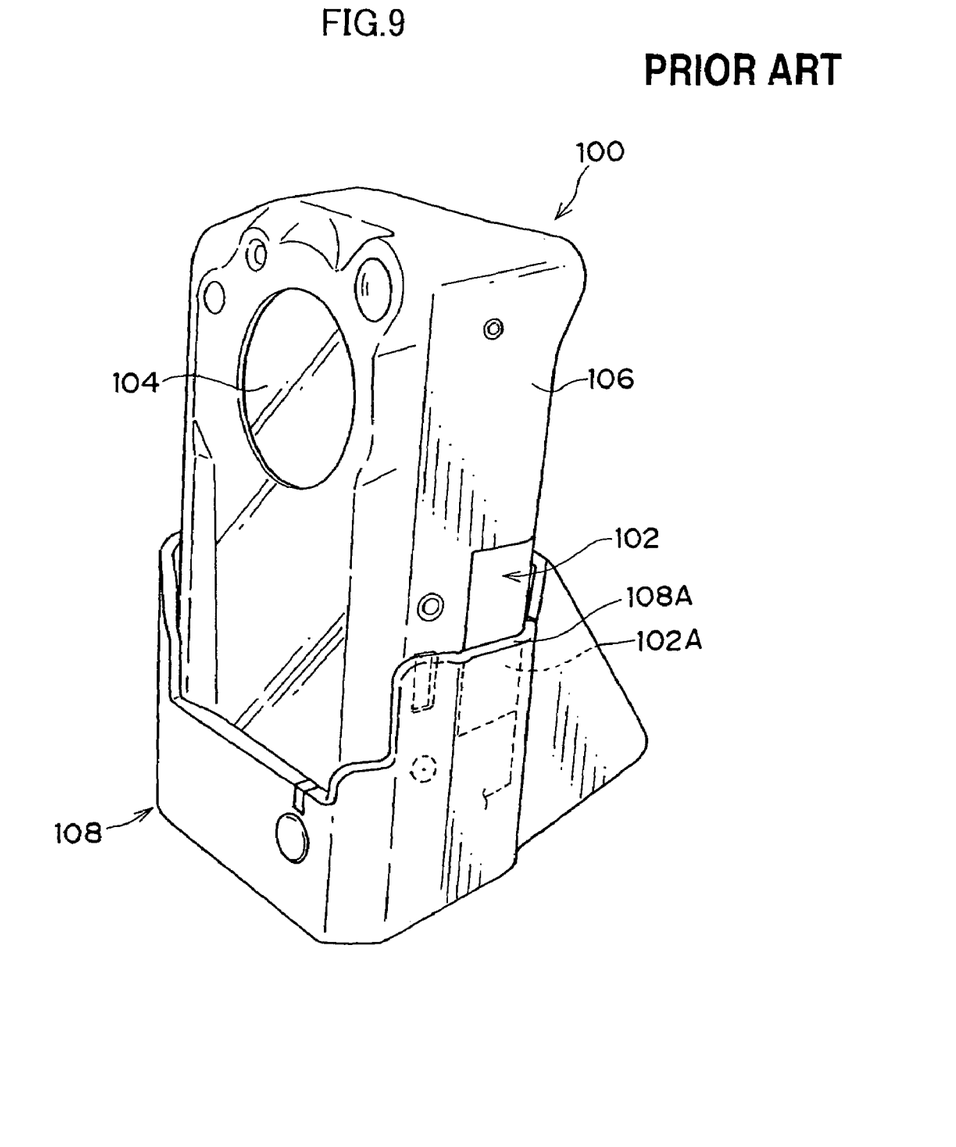
FIG. 9 is a perspective view showing a stand for digital camera in a prior art.

However, as shown in FIG. 9, in an ordinal digital camera 100, a recording medium accommodating portion 102 which accommodates a recording medium is provided at a lower side portion of a main body 106 of the digital camera 100, the lower side portion being apart from a portion, at which a member necessary for photographing function is provided, such as a lens accommodating portion 104. Accordingly, in a state in which the digital camera 100 is mounted on a stand (a cradle) 108, a lower portion 102A of the recording medium accommodating portion 102 is positioned inside a side wall portion 108A of the cradle 108, therefore, a door of the recording medium accommodating portion 102 cannot be opened. Accordingly, the recording medium cannot be pulled out from the recording medium accommodating portion 102. Accordingly, when the recording medium is pulled out from the main body 106, it is necessary to disengage the digital camera 100 from the cradle 108, and this operation is troublesome.

SUMMARY OF THE INVENTION

In view of the aforementioned circumstances, it is an object of the present invention to provide a stand for digital camera in which a recording medium can be attached to or detached from a main body of the digital camera in a state in which the digital camera is mounted on the stand for digital camera.

A first aspect of the present invention is a stand for digital camera comprising a recording medium attaching and detaching portion by which recording medium can be attached to or detached from a main body of the digital camera in a state in which the digital camera is mounted on the stand for digital camera.

In a second aspect of the present invention according to the first aspect, the recording medium attaching and detaching portion is an opening and closing portion.

In a third aspect of the present invention according to the first aspect, the recording medium attaching and detaching portion is a cut-out portion.

A fourth aspect of the present invention is a stand for digital camera comprising: a wall formed substantially upwardly at a holding portion on which a main body of the digital camera is mounted; and a recording medium attaching and detaching portion, formed at the wall, by which recording medium can be attached to or detached from the main body in a state in which the digital camera is mounted on the stand for digital camera.

In a fifth aspect of the present invention according to the fourth aspect, the recording medium attaching and detaching portion is an opening and closing portion.

In a sixth aspect of the present invention according to the fourth aspect, the recording medium attaching and detaching portion is a cut-out portion.

In a seventh aspect of the present invention according to the fifth aspect, the recording medium attaching and detaching portion can rotate around a rotation-axis thereof.

In an eighth aspect of the present invention according to the fifth aspect, the recording medium attaching and detaching portion can slide on the wall.

In a ninth aspect of the present invention according to the eighth aspect, the recording medium attaching and detaching portion is provided with a grip portion for griping.

In a tenth aspect of the present invention according to the seventh or eighth aspect, the recording medium attaching and detaching portion faces a portion of a cover of the main body for covering an opening of an accommodating portion for accommodating the recording medium, in a state in which the digital camera is mounted on the holding portion of the stand.

Accordingly, in the first and fourth aspects of the present invention, even in a state in which the digital camera is mounted on the stand, the recording medium can be attached to or detached from the main body of the digital camera due to the recording medium attaching and detaching portion. Therefore, operationability is improved.

In the second aspect of the present invention, because the recording medium attaching and detaching portion is the opening and closing portion which can be opened and closed, by opening the opening and closing portion, the recording medium can be attached to or detached from the main body of the digital camera even in a state in which the digital camera is mounted on the stand. Moreover, by closing the opening and closing portion, performance of supporting digital camera by the stand is improved.

In the third aspect of the present invention, in addition to the effect of the first aspect, because the opening and closing portion can be easily formed by forming the cut-out portion at the stand, the structure of the stand is simple.

DESCRIPTION OF THE PREFERRED EMBODIMENTS

First Embodiment

Referring to FIGS. 1–4, a stand for a digital camera relating to a first embodiment of the present invention will now be described hereinafter in detail.

Figure 4:
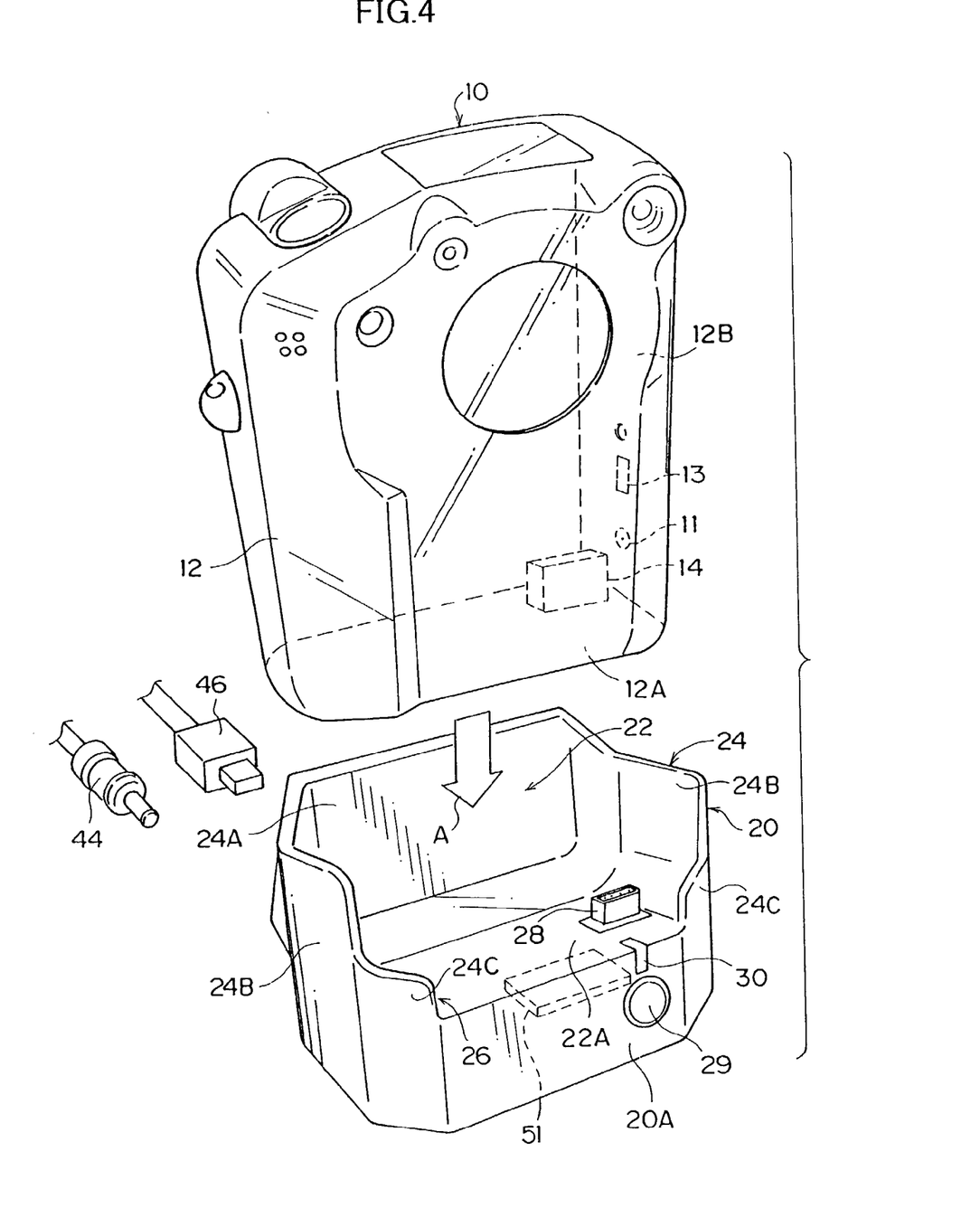
FIG. 4 is a perspective view showing the stand for digital camera according to the first embodiment of the present invention in a state in which the digital camera is not mounted on the stand for digital camera.

As shown in FIG. 4, a composite terminal 14 is formed at a lower surface 12A of a main body 12 of a digital camera 10 in order to connect to a stand for digital camera 20 (hereinafter, a cradle 20). The composite terminal 14 is a terminal in which a terminal for charging and a USB terminal as a terminal for connecting to a personal computer are integrated. Also, the digital camera 10 can be mounted on a holding portion 22 of the cradle 20 downwardly from above (namely, in a direction indicated by an arrow A in FIG. 4).

A terminal for charging 11 and a USB terminal 13 are respectively formed at a lower portion of a side surface 12B of the main body 12 of the digital camera 10. The terminal for charging 11 and the USB terminal 13 are used when the digital camera 10 is not mounted on the cradle 20.

The holding portion 22 on which the digital camera 10 is mounted is formed at an upper portion of the cradle 20. A wall portion 24 having a rear wall 24A, both side walls (left and right walls) 24B and a front wall 24C is formed upwardly at a peripheral portion of the cradle 20. Among the walls forming the wall portion 24, a height of the rear wall 24A is the highest, the both side walls 24B are the second highest, and the front wall 24C is the lowest. The front wall 24C is divided into left and right portions by a cut-out 26 formed at a central portion thereof in a width direction. Inner peripheral configuration of the wall portion 24 at the holding portion 22 substantially coincides with outer peripheral configuration of the lower portion of the main body 12 of the digital camera 10. The lower surface 12A of the main body 12 of the digital camera 10 always abuts on a predetermined position at a bottom portion 22A of the holding portion 22 in a state in which the digital camera 10 is mounted on the holding portion 22 of the cradle 20.

Figure 1:
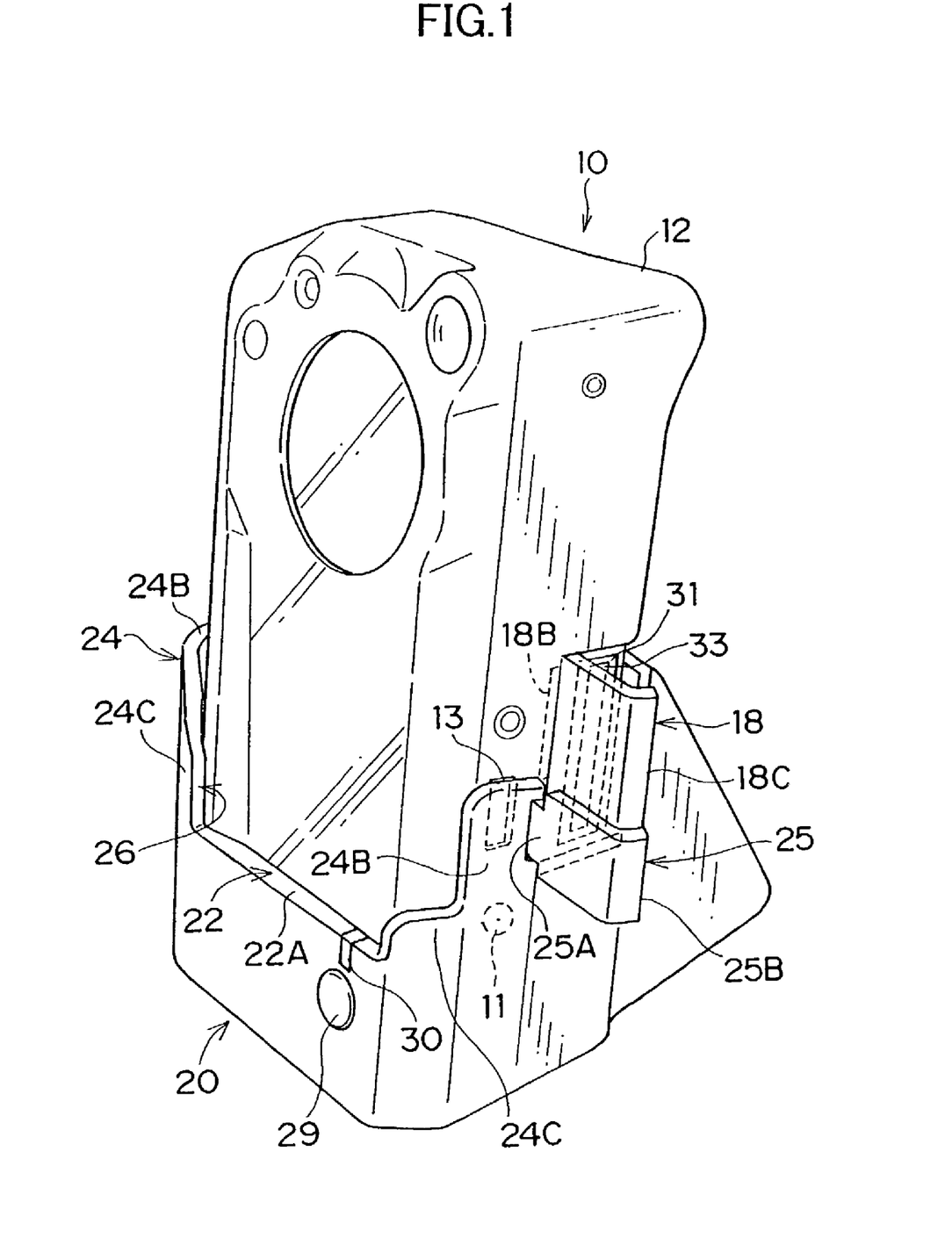
FIG. 1 is a perspective view showing a stand for digital camera according to a first embodiment of the present invention in a state in which an opening and closing wall portion is opened.

As shown in FIG. 1, a cover (a slot cover) 18 capable of opening and closing is formed at the lower portion of the side surface 12B of the main body 12 of the digital camera 10. A recording medium 33 can be attached to or detached from (inserted into or pulled out from) a slot 31 built into the main body 12 of the digital camera 10 by the cover 18 being opened.

Figure 2:
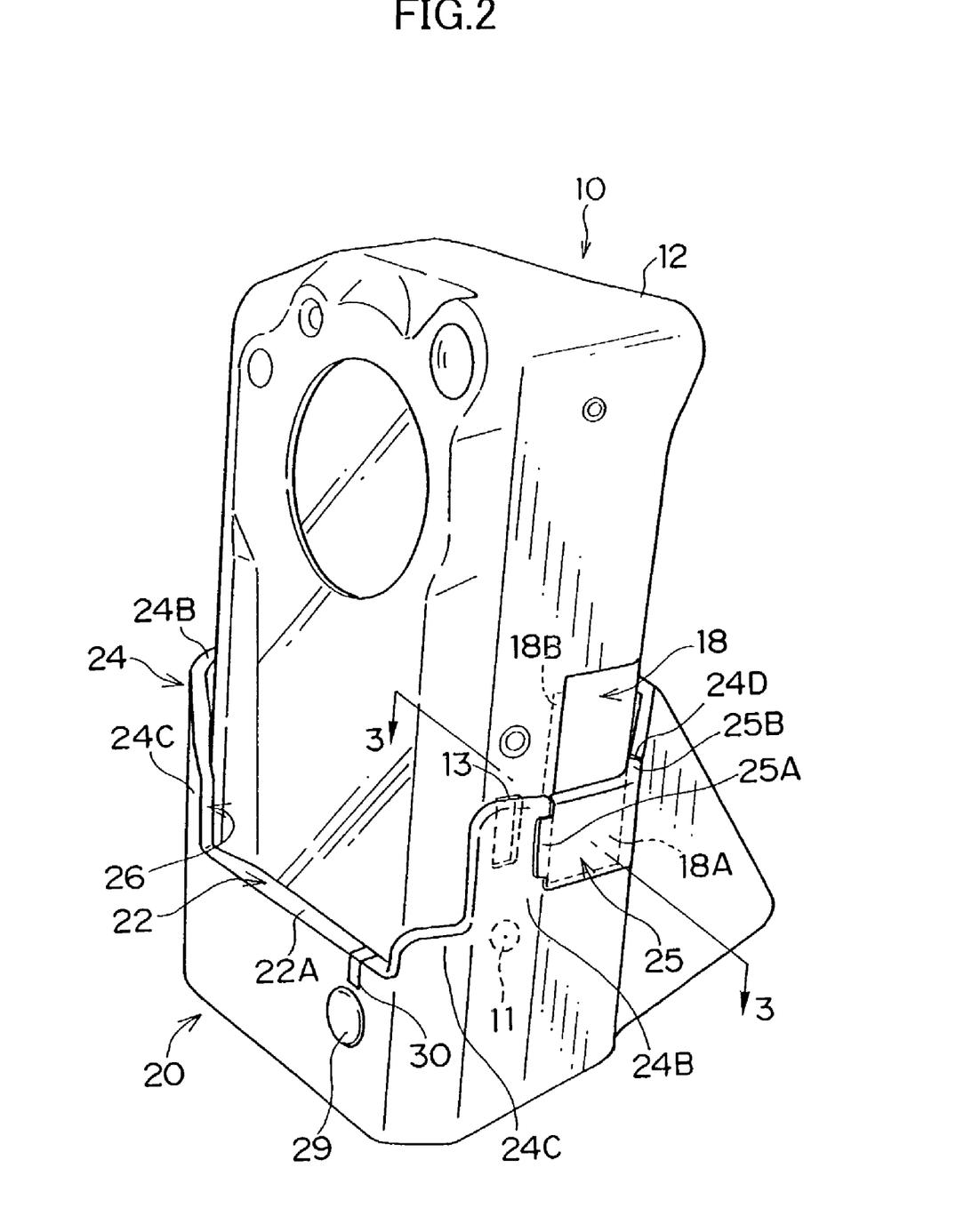
FIG. 2 is a perspective view showing the stand for digital camera according to the first embodiment of the present invention in a state in which the opening and closing wall portion is closed.

As shown in FIG. 2, a portion of the wall portion 24 of the cradle 20, facing a lower portion 18A of the slot cover 18 in a state in which the digital camera 10 is mounted on the holding portion 22 of the cradle 20, is an opening and closing wall portion 25 serving as a recording medium attaching and detaching portion.

Figure 3:
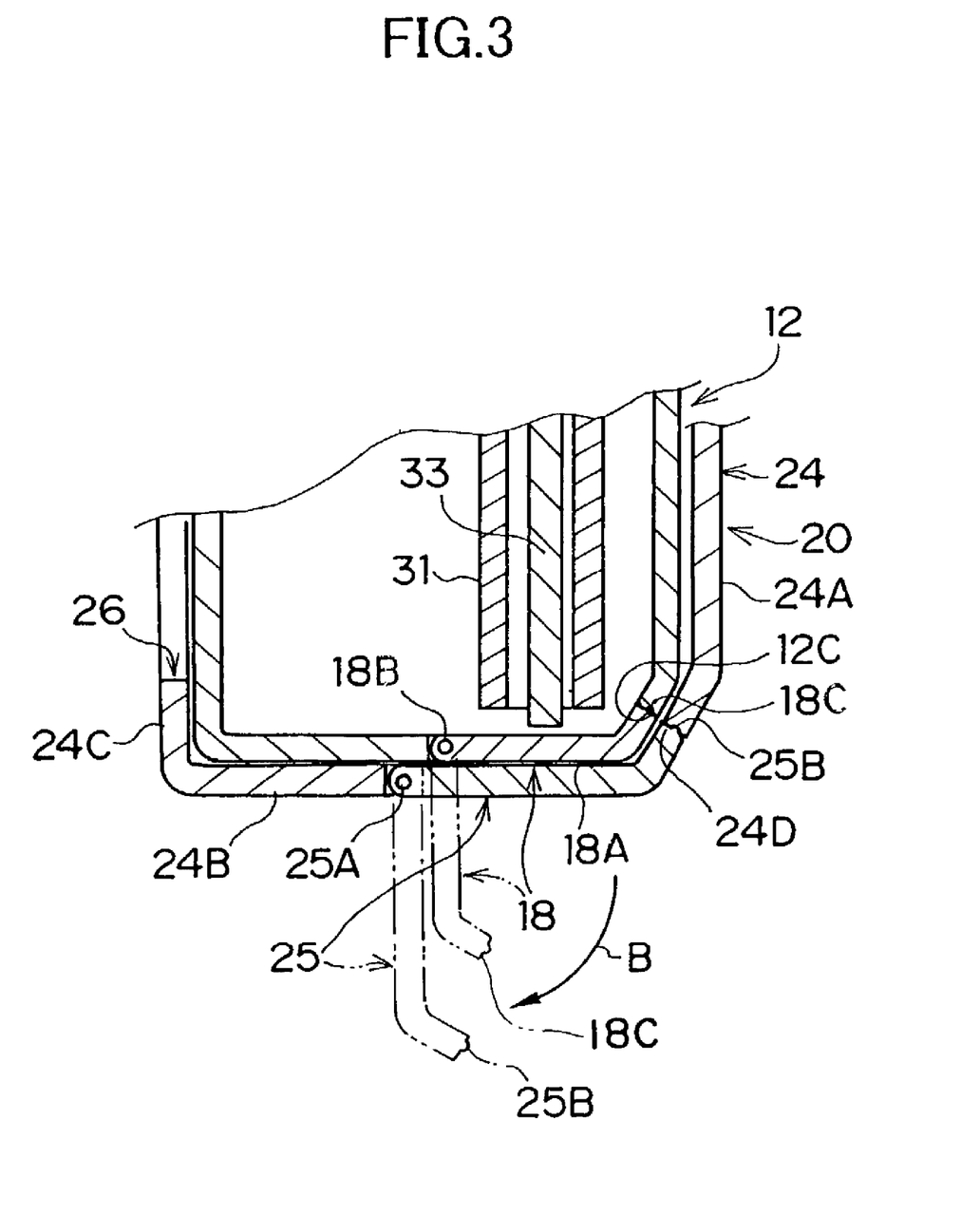
FIG. 3 is a cross sectional view along 3—3 line in FIG. 2.

As shown in FIG. 3, the opening and closing wall portion 25 of the cradle 20 can be rotated frontward (in a direction indicated by an arrow B in FIG. 3) by a hinge 25A formed at a front end portion of the opening and closing wall portion 25 (namely, the opening and closing wall portion 25 can be rotated around an axis thereof). In a closed state in which the opening and closing wall portion 25 is closed, indicated by solid lines in FIG. 3, an engaging portion 25B formed at a rear end portion of the opening and closing wall portion 25 is engaged with an engaging portion 24D formed between the rear wall 24A and the side wall 24B of the wall portion 24. It is also preferable that the engaging portion 25B abuts on the engaging portion 24D in the closed state. It is preferable that the opening and closing wall portion 25 is urged in a closing direction thereof by a spring or the like.

On the other hand, the cover 18 of the digital camera 10 can be rotated forward (in the direction indicated by the arrow B in FIG. 3) by a hinge 18B formed at a front end portion of the cover 18. In a closed state in which the cover 18 is closed, indicated by solid lines in FIG. 3, an engaging portion 18C formed at a rear end portion of the cover 18 is engaged with an engaging portion 12C formed at a side of the main body 12. It is also preferable that the cover 18 is urged such that the engaging portion 12C is held by or abuts on the engaging portion 12C in the closed state.

The hinge 25A of the opening and closing wall portion 25 of the cradle 20 is positioned forward in a camera-front direction (that is, in a direction toward a front of the digital camera) with respect to a position of the hinge 18B of the cover 18 of the digital camera 10. By moving the opening and closing wall portion 25 to an open position thereof indicated by two-dot chain lines in FIG. 3, the cover 18 can be moved to an open position thereof indicated by two-dot chain lines in FIG. 3. Accordingly, the recording medium 33 can be attached to or detached from the slot 31 when the opening and closing wall portion 25 of the cradle 20 and the cover 18 of the digital camera 10 are in an open state shown in FIG. 1.

As shown in FIG. 4, a composite terminal connecting portion 28, in which a charging terminal connecting portion and a USB terminal connecting portion are integrated, is formed at the bottom portion 22A of the holding portion 22 of the cradle 20. The composite terminal connecting portion 28 is formed at a position at which the composite terminal connecting portion 28 is connected to the composite terminal 14 of the digital camera 10 in a state in which the digital camera 10 is mounted on the holding portion 22 of the cradle 20. Accordingly, when the digital camera 10 is mounted on the holding portion 22 of the cradle 20, the composite terminal connecting portion 28 of the cradle 20 is automatically connected to the composite terminal 14 of the digital camera 10.

A main switch 29, which is of a push button type, is provided at a front surface 20A of the cradle 20. A power supply of the cradle 20 can be changed between a power-on state and a power-off state by pushing-operation of the main switch 29. Also, a display portion 30, which comprises a LED (light emitting diode) and serves as displaying means for indicating a communicating state and as displaying means for indicating a charging state, is provided at the front surface 20A of the cradle 20. The display portion 30 is located above the main switch 29. An upper portion of the display portion 30 is also exposed at the bottom portion 22A of the holding portion 22.

A terminal for charging and a USB terminal are respectively formed at a rear surface of the cradle 20 (not shown in the drawings). A cord for charging 44 and a USB cord 46 serving as a cord for connecting to an external device can be connected respectively to the terminal for charging and the USB terminal.

A control circuit 51 provided with a microcomputer is built into the cradle 20. The control circuit 51 is set such that communication by the USB terminal is automatically started in a case in which the digital camera 10 is mounted on the holding portion 22 of the cradle 20 and it is detected that the composite terminal connecting portion 28 and the composite terminal 14 are in a conducting state.

Also, the display portion 30 is controlled by the control circuit 51 so that the display portion 30 lights up, for example, yellow when communication is performed by the USB terminal, and the displaying portion 30 lights up, for example, red when charging is preformed by the terminal for charging.

Next, operation of the present invention according to the present embodiment will be described.

In the present embodiment, by the digital camera 10 being mounted on the holding portion 22 of the cradle 20, the composite terminal connecting portion 28 formed at the holding portion 22 of the cradle 20, in which the charging terminal connecting portion and the USB terminal connecting portion are integrated, is automatically connected to the composite terminal 14 in which the terminal for charging and the USB terminal of the digital camera 10 are integrated.

Also, in the present embodiment, by making the opening and closing wall portion 25 rotate in the direction indicated by the arrow B shown in FIG. 3 so as to be positioned in the open position thereof indicated by the two-dot chain lines in FIG. 3, the cover 18 can be moved to the open position thereof indicated by the two-dot chain lines in FIG. 3 in a state in which the digital camera 10 is mounted on the holding portion 22 of the cradle 20. Accordingly, even in a state in which the digital camera 10 is mounted on the holding portion 22 of the cradle 20, the recording medium 33 can be attached to or detached from the slot 31 by the opening and closing wall portion 25 of the cradle 20 and the cover 18 of the digital camera 10 being in the open state as shown in FIG. 1. Therefore, operationability is improved.

Moreover, in the present embodiment, as shown in FIG. 2, by closing the opening and closing wall portion 25 of the cradle 20 and the cover 18 of the digital camera 10, performance of (capability for) supporting digital camera 10 by the wall portion 24 of the cradle 20 is improved.

Second Embodiment

Figure 5:
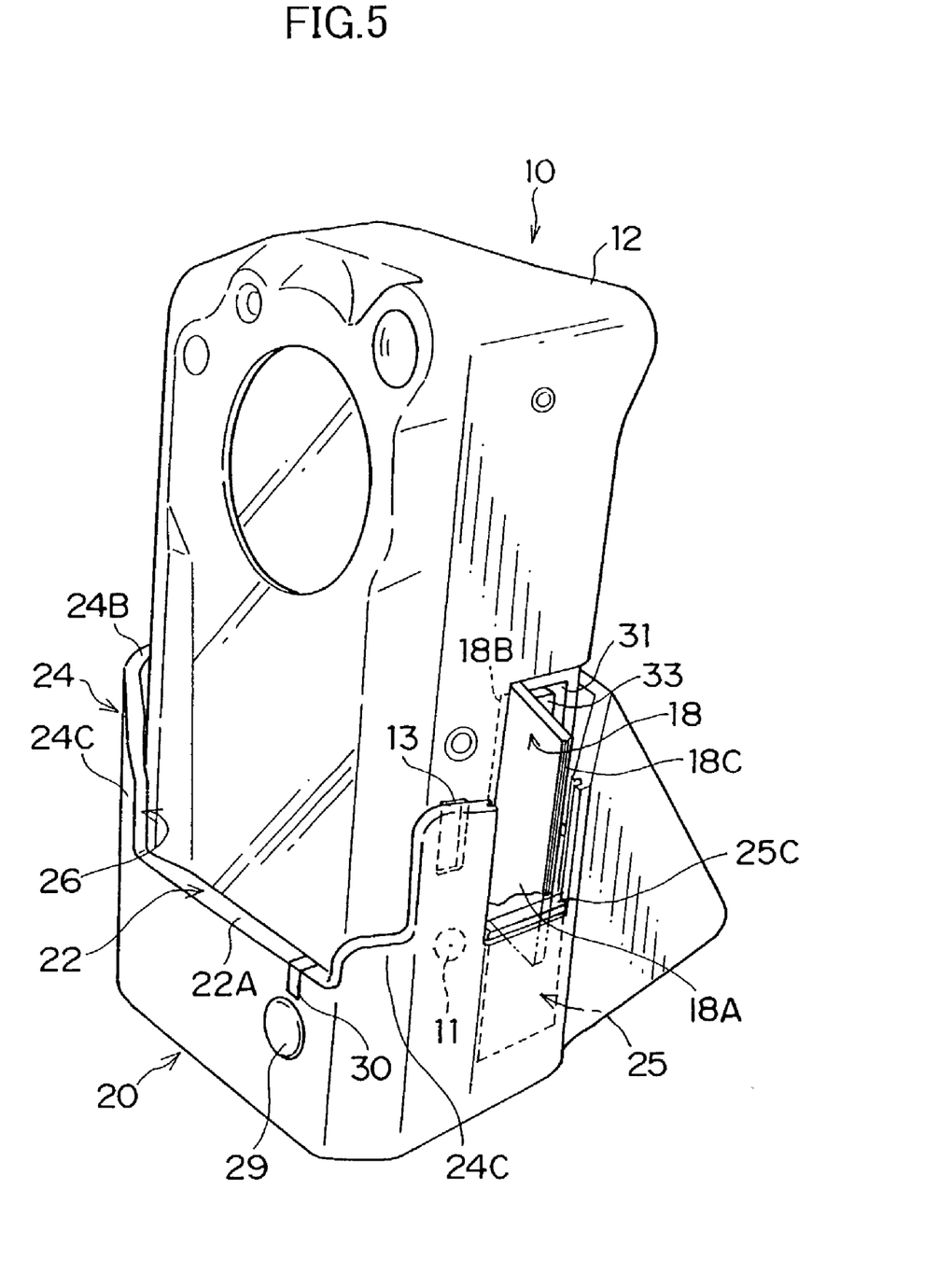
FIG. 5 is a perspective view showing a stand for digital camera according to a second embodiment of the present invention in a state in which an opening and closing wall portion is opened.
Figure 6:
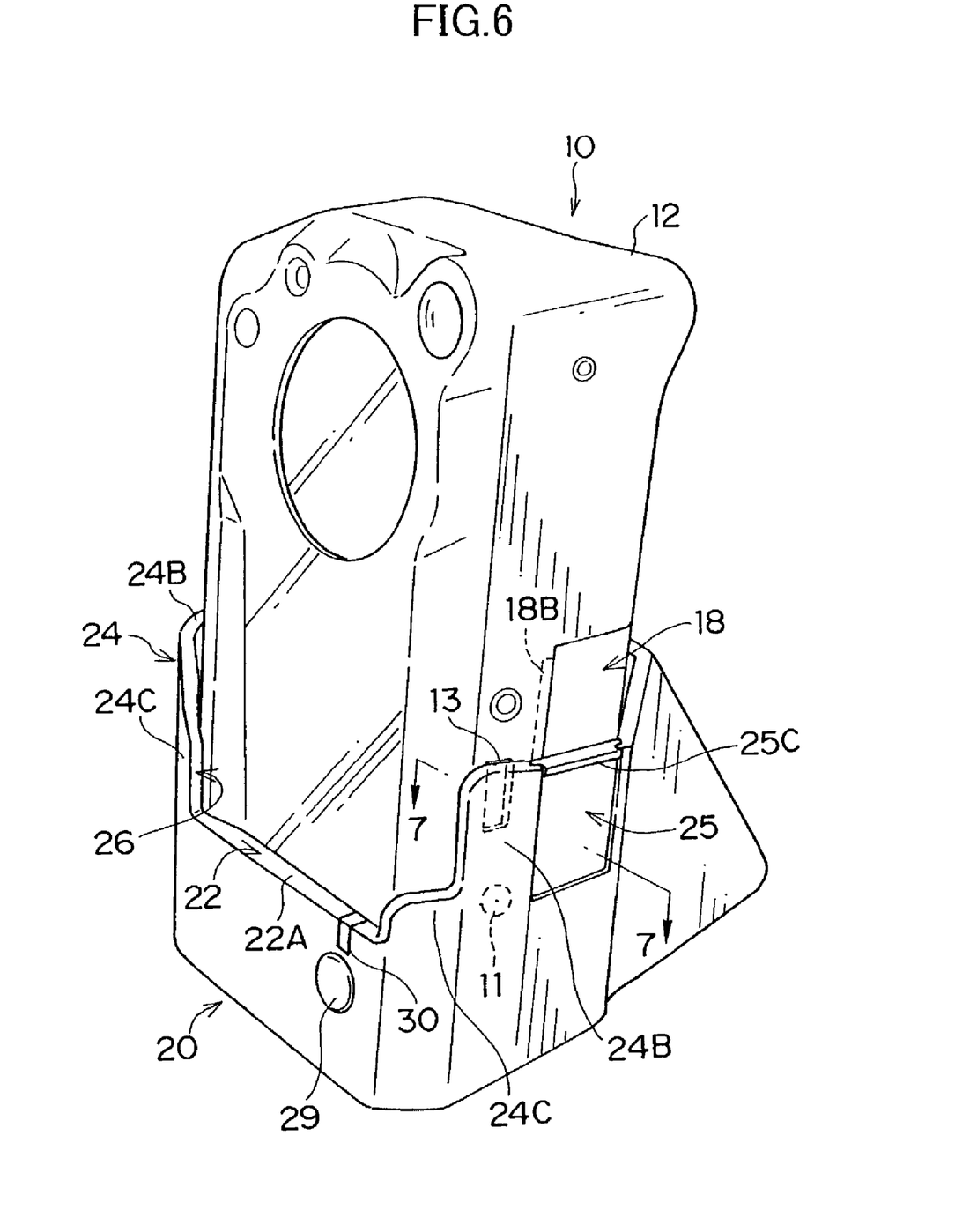
FIG. 6 is a perspective view showing the stand for digital camera according to the second embodiment of the present invention in a state in which the opening and closing wall portion is closed.
Figure 7:
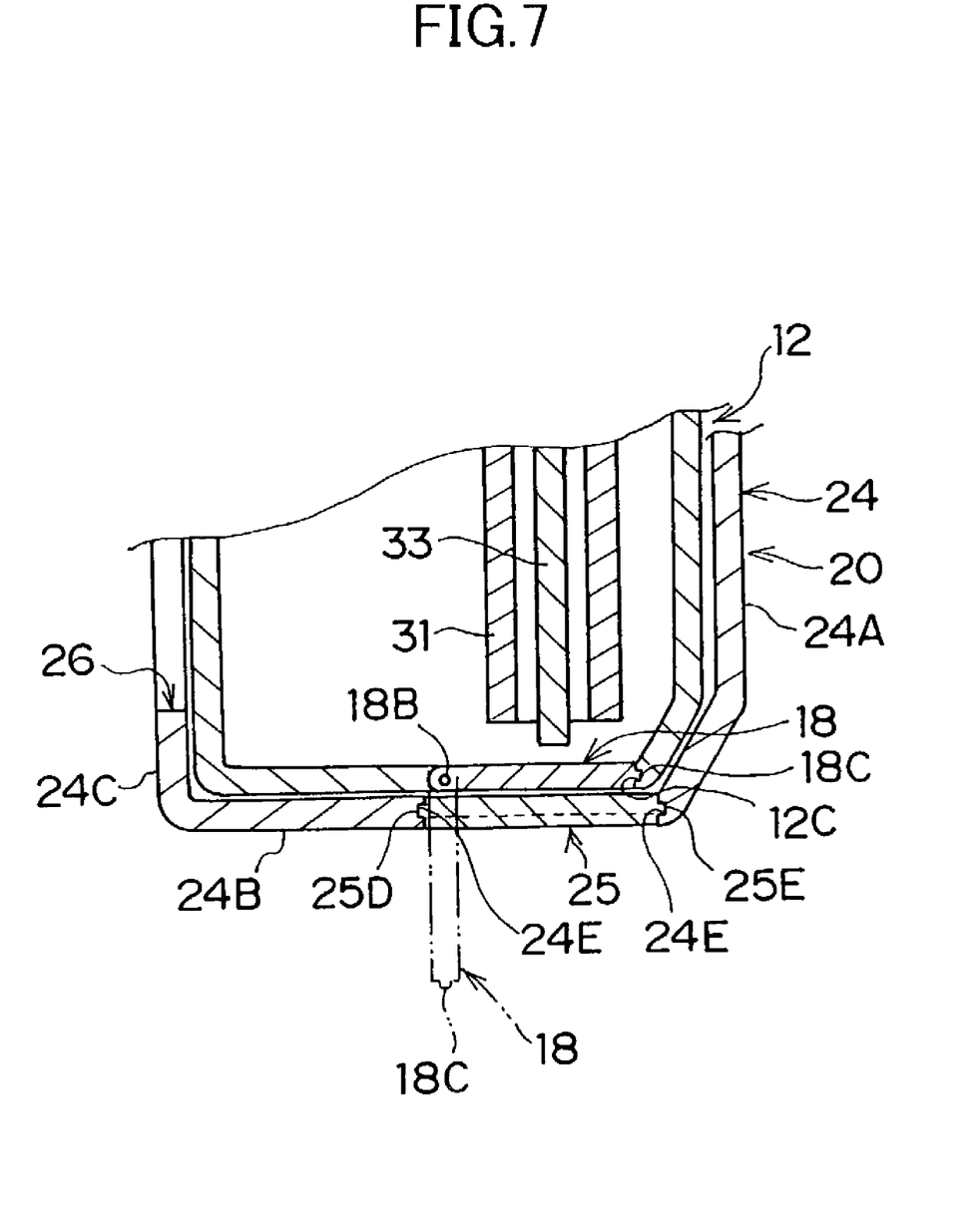
FIG. 7 is a cross sectional view along 7—7 line in FIG. 6.

Referring to FIGS. 5–7, a cradle for digital camera relating to a second embodiment of the present invention will be described hereinafter in detail.

Hereinafter, the same reference numerals are applied to the same components, members and structures as those of the first embodiment and the descriptions thereof are omitted.

As show in FIGS. 5 and 6, in the present embodiment, the opening and closing wall portion 25 of the cradle 20 is slidable in upward and downward directions. By gripping a grip portion 25C formed at an upper portion of the opening and closing wall portion 25 and moving it downward, the opening and closing wall portion 25 can be moved from a closing position thereof shown in FIG. 6 to an open position thereof shown in FIG. 5.

As shown in FIG. 7, convex portions 25D and 25E are formed respectively at a front end portion and a rear end portion of the opening and closing wall portion 25. The convex portions 25D and 25E are inserted into guide rails 24E formed at the wall portion 24 of the cradle such that the opening and closing wall portion 25 of the cradle 20 is slidable by force applied thereto equal to or more than a predetermined value. Accordingly, the opening and closing wall portion 25 can be held at the closing position shown in FIG. 6.

The convex portion 25D at the front side of the opening and closing wall portion 25 of the cradle 20 is positioned forward with respect to a position of the hinge 18B of the cover 18 of the digital camera 10 in a camera-front direction (that is, in a direction toward a front of the digital camera). By that the opening and closing wall portion 25 is positioned in an open position thereof shown in FIG. 6, the cover 18 can be moved to an open position thereof indicated by two-dot chain lines in FIG. 7. Accordingly, the recording medium 33 can be attached to or detached from the slot 31 when the opening and closing wall portion 25 of the cradle 20 and the cover 18 of the digital camera 10 are in an open state shown in FIG. 5.

Next, an operation of the second embodiment will be described.

In the present embodiment, by making the opening and closing wall portion 25 slide downward so as to be positioned in the open position thereof shown in FIG. 5, the cover 18 of the digital camera 10 can be moved to the open position thereof indicated by the two-dot chain lines in FIG. 7 in a state in which the digital camera 10 is mounted on the holding portion 22 of the cradle 20. Accordingly, even in a state in which the digital camera 10 is mounted on the holding portion 22 of the cradle 20, the recording medium 33 can be attached to or detached from the slot 31 by the opening and closing wall portion 25 of the cradle 20 and the cover 18 of the digital camera 10 being in the open state shown in FIG. 5. Therefore, operationability is improved.

Moreover, in the present embodiment, as shown in FIG. 6, by closing the opening and closing wall portion 25 of the cradle 20 and the cover 18 of the digital camera 10, performance of (capability for) supporting digital camera 10 by the wall portion 24 of the cradle 20 is improved.

Third Embodiment

Figure 8:
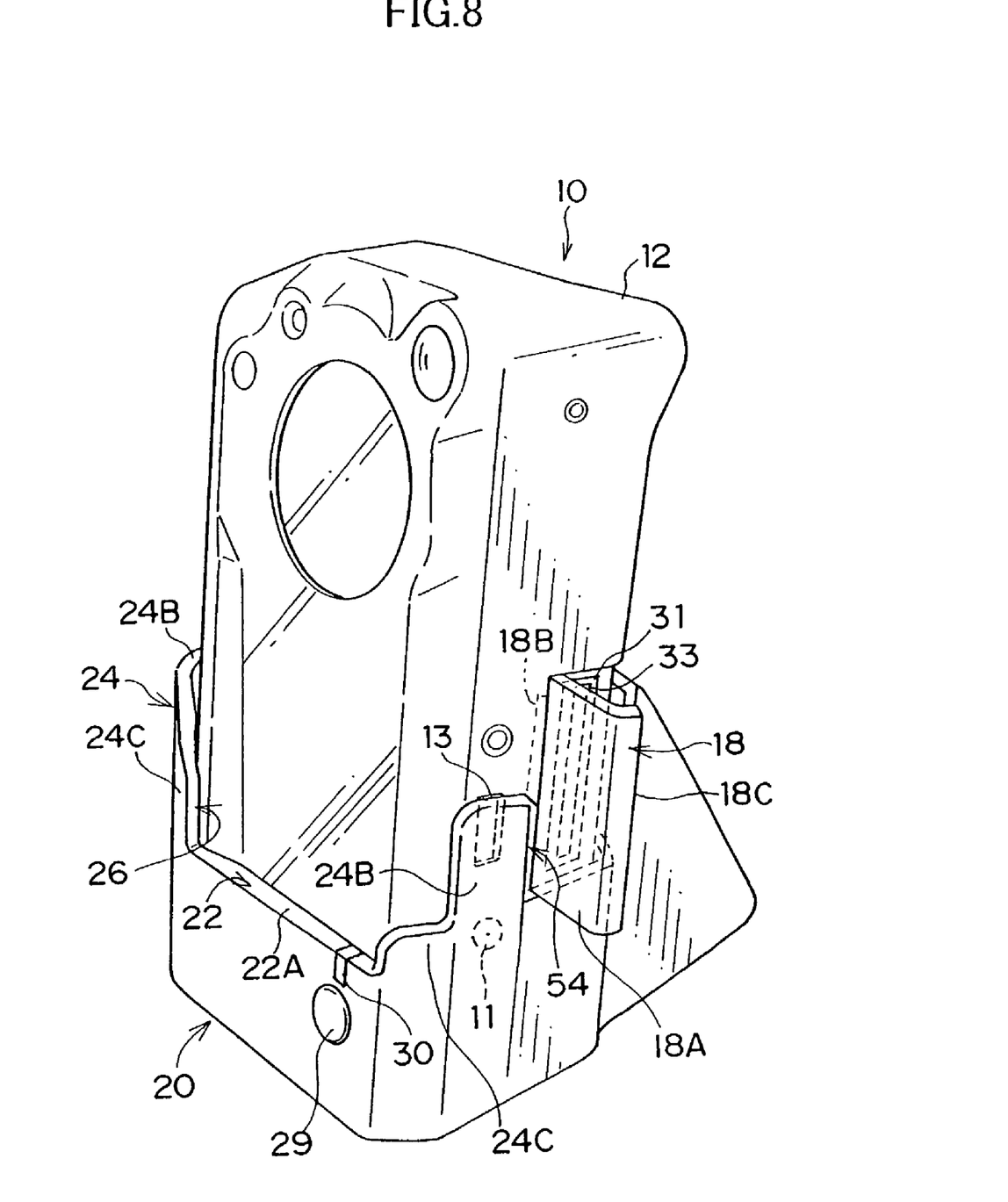
FIG. 8 is a perspective view showing a stand for digital camera according to a third embodiment of the present invention.

Referring to FIG. 8, a cradle for digital camera relating to a third embodiment of the present invention will be described hereinafter in detail.

Hereinafter, the same reference numerals are applied to the same components, members and structures as those of the first embodiment and the descriptions thereof are omitted.

As shown in FIG. 8, in the present embodiment, instead of the opening and closing wall portion 25 of the cradle 20 in the respective embodiments described above, a cut-out portion 54 whose configuration is rectangle, as recording medium attaching and detaching means, is formed at the wall portion 24 of the cradle 20 from an upper portion of the wall portion 24. Due to this cut-out portion 54, the cover 18 of the digital camera 10 can be moved to an open position thereof.

Next, an operation of the third embodiment will be described.

In the present embodiment, due to the cut-out portion 54 formed at the wall portion 24 of the cradle 20, the cover 18 of the digital camera can be moved to the open position thereof shown in FIG. 8 in a state in which the digital camera 10 is mounted on the holding portion 22 of the cradle 20. Accordingly, even in a state in which the digital camera 10 is mounted on the holding portion 22 of the cradle 20, the recording medium 33 can be attached to or detached from the slot 31. Therefore, operationability is improved.

Moreover, in the present embodiment, because the cut-out portion 54 is easily formed at the cradle 20, the structure of the cradle 20 is simple.

The specified embodiments of the present invention are described above in detail, however, the present invention is not limited to the same. It is obvious to the person skilled in the art that various other embodiments can be provided within the scope of the present invention. For example, the recording medium attaching and detaching means formed at the cradle 20 is not limited to the opening and closing wall portion 25 or the cut-out portion 54 in the embodiments described above.

In the first and the fourth aspects of the present invention, due to the structure described above, there is provided excellent effect in that, even in a state in which the digital camera is mounted on the cradle, the recording medium can be attached to or detached from the main body of the digital camera.

Further, in the second and the fifth aspects of the present invention, in addition to the effect of the first and fourth aspects, there is provided excellent effect in that performance of supporting digital camera by the cradle is improved.

Further, in the third and the sixth aspects of the present invention, in addition to the effect of the first and fourth aspects, there is provided excellent effect in the structure of the cradle is simple.

What is claimed is:

1. A stand for a digital camera, the stand comprising:
 a recording medium attaching and detaching portion, through which a recording medium can be attached to or detached from a main body of the digital camera in a state in which the digital camera is mounted on the stand,
 wherein said recording medium attaching and detaching portion is an opening and closing portion, such that said recording medium is attached to or detached from said main body through said opening and closing portion.

2. A stand for the digital camera according to claim 1, wherein the opening and closing portion has convex portions that slidably engage with guide rails of a wall of the stand, such that the opening and closing portion can slide between an open state and a closed state.

3. A stand for the digital camera according to claim 2, wherein, when the opening and closing portion is in the closed state, the opening and closing portion at least partially opposes the recording medium of the digital camera when the digital camera is mounted on the stand.

4. A stand for the digital camera according to claim 1, wherein the recording medium attaching and detaching portion is provided at the stand at a position which corresponds to a position of an accommodating portion at which said recording medium is accommodated in said main body of said digital camera.

5. A stand for a digital camera, the stand comprising:
 a wall formed substantially upwardly at a holding portion on which a main body of the digital camera is mounted; and
 a recording medium attaching and detaching portion, formed at the wall, through which a recording medium can be attached to or detached from the main body in a state in which the digital camera is mounted on the stand,
 wherein said recording medium attaching and detaching portion is an opening and closing portion, such that said recording medium is attached to or detached from said main body through said opening and closing portion.

6. A stand for digital camera according to claim 5, wherein said recording medium attaching and detaching portion can rotate.

7. A stand for digital camera according to claim 6, wherein said recording medium attaching and detaching portion faces a portion of a cover of the main body for covering an opening of an accommodating portion for accommodating the recording medium, in a state in which the digital camera is mounted on the holding portion of the stand.

8. A stand for digital camera according to claim 5, wherein said recording medium attaching and detaching portion can slide on the wall.

9. A stand for digital camera according to claim 8, wherein said recording medium attaching and detaching portion is provided with a grip portion for gripping.

10. A stand for digital camera according to claim 8, wherein said recording medium attaching and detaching portion faces a portion of a cover of the main body for covering an opening of an accommodating portion for accommodating the recording medium, in a state in which the digital camera is mounted on the holding portion of the stand.

* * * * *